Oct. 19, 1965    E. L. FRITZBERG    3,212,461
EXTRUSION DEVICE
Filed March 20, 1962
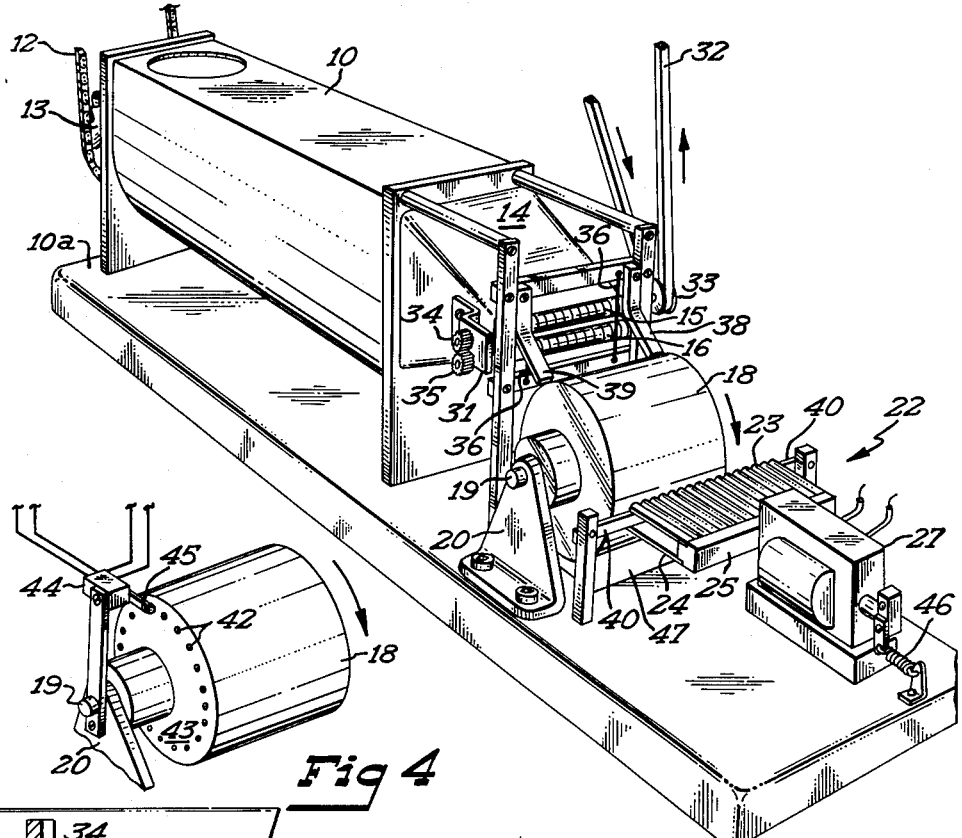
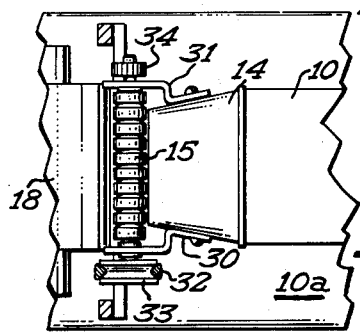
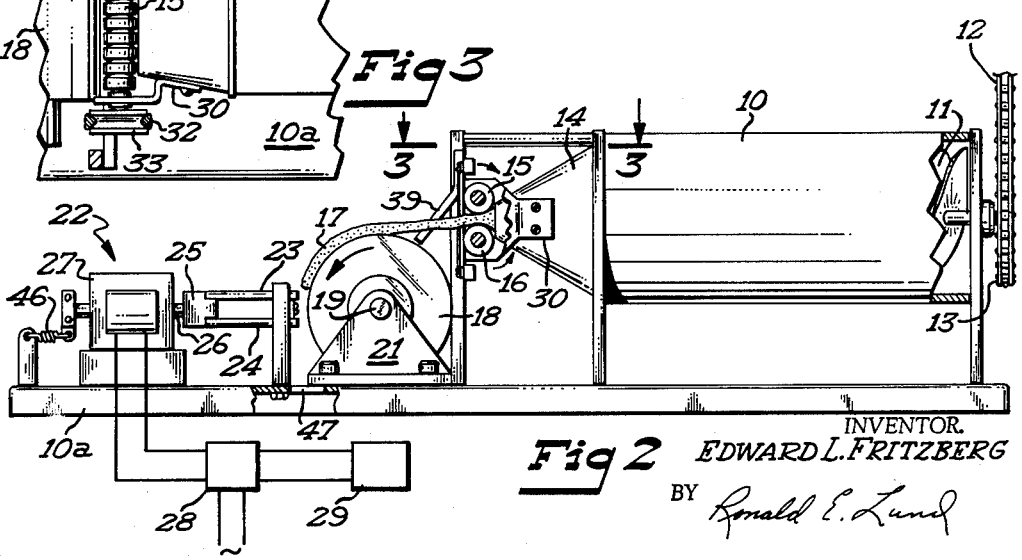
INVENTOR.
EDWARD L. FRITZBERG
BY Ronald E. Lund
ATTORNEY United States Patent Office 3,212,461
Patented Oct. 19, 1965

3,212,461
EXTRUSION DEVICE
Edward L. Fritzberg, Minneapolis, Minn., assignor to The Pillsbury Company, Minneapolis, Minn., a corporation of Delaware
Filed Mar. 20, 1962, Ser. No. 180,968
7 Claims. (Cl. 107—54)

This invention relates generally to extrusion apparatus and more particularly to extrusion apparatus adapted for use in extruding an edible dough.

A highly viscous material has a tendency to spall when extruded through a die or nozzle. The tendency to spall can be reduced somewhat by incorporating a lubricant within the dough; however, when a viscous dough is extruded to form food articles, the properties of taste, texture and keeping qualities often preclude the use of a lubricant. Extrudable dough formed from potato flakes in the manner described in my copending application of common assignee, Serial Number 186,655, which was filed on April 11, 1962, for Potato Product and Method, is illustrative of dough which is difficult to extrude.

The spalling problem is particularly acute when a corrugated extrusion die is used because of the increased surface area which such a die presents. The use of such a die is necessary to produce extruded food items having a corrugated surface, such as French fries of the type which are known popularly as "crinkle cut" French fries.

French fries which are formed from an extrudable dough as described in the above-mentioned copending application are advantageous because the individual French fry pieces can be made equal in size, thereby eliminating variation in frying time. French fries of this type can be formed by extruding a sheet of dough and cutting the sheet transversely to form elongated pieces of dough having a square cross section. An apparatus capable of continuously extruding and cutting a sheet of dough in this manner has not, heretofore, been available.

It is, therefore, a general object of the invention to provide an improved die through which a dough can be extruded without spalling.

Another objective of the invention is to provide an improved extrusion die capable of forming a sheet of dough having a corrugated surface without surface spalling.

A further object of the invention is to provide an apparatus capable of rapidly extruding a sheet of edible dough and cutting the extruded sheet transversely to form elongated strips.

A yet further object of the invention is to provide an apparatus capable of rapidly forming at a variable rate corrugated French fries of equal size from a viscous dough.

Other objects of the invention will become apparent from the following description of the invention and the drawings attached thereto wherein:

FIG. 1 is a perspective view of an extrusion apparatus incorporating the features of the present invention;

FIG. 2 is an elevation view of the apparatus of FIG. 1;

FIG. 3 is a plan view taken on line 3—3 of FIG. 2 showing in detail the extrusion die of the apparatus of FIGS. 1 and 2; and FIG. 4 is an illustration of another embodiment of the invention for controlling the rate of reciprocation of the cutter of the extrusion apparatus.

In accordance with the present invention, the tendency of a viscous dough to spall at its surface is eliminated completely by the provision of an extrusion die in which at least the major surfaces of the substance being extruded are formed by rollers, rotating in the direction of dough extrusion, the peripheral velocity of which is greater than the linear velocity of the material passing through the die. If corrugated rollers are used, a corrugated sheet may be easily extruded without spalling.

As will be illustrated below, in connection with the description of a preferred embodiment of the present invention, there is also provided in combination with the above described extrusion die, a rapidly reciprocating cutter through which an extruded sheet of dough is passed and cut transversely into elongated strips resembling French fries. In one form of the overall apparatus, the rate of reciprocation of the cutter is controlled by means responsive to the linear velocity of the sheet of dough being extruded. A controlled apparatus of this type is extremely useful in rapidly forming from a viscous dough, French fries of equal size.

As noted above, it has been discovered that surface spalling during the extrusion of a dough is eliminated by the use of rotating rollers with peripheral velocity of which is in excess of the linear speed of the dough being extruded. As long as the peripheral velocity is in excess of the dough, spalling will not occur. Therefore, any peripheral velocity in excess of the linear velocity of the extruding dough is suitable.

To facilitate a more complete understanding of the present invention, reference is made to FIGS. 1 and 2 which are perspective and elevation views, respectively, of an apparatus incorporating the features of the present invention, and to FIG. 3 which is a plan view of the extrusion die of the apparatus. Disposed within a reservoir 10, which is mounted on a supporting frame 10a, is a rotatable helical feeding screw 11, which is driven by an electrical motor (not shown) through a driving chain 12 and sprocket 13. Rigidly affixed to the discharge end of dough reservoir 10 is a trapezoidally-shaped, tapered, forming die 14. The outlet of die 14 is defined by a pair of horizontally-disposed, corrugated rollers 15 and 16.

The sheet of extruded dough 17 (shown only in FIG. 2) which emerges from forming die 14 through rollers 15 and 16 falls upon and is supported by a rotatable, cylindrical drum 18 formed from any suitable moderately resilient deformable material having a nonadherent surface such as polytetrafluoroethylene which is sold under the registered trademark Teflon by the E. I. Du Pont Company, Wilmington, Delaware. Drum 18 is carried by an affixed shaft 19 which turns within bearings provided in supporting members 20 and 21 and is caused to rotate by the extruding sheet of dough 17.

A cutter designated generally as 22 is mounted on supporting frame 10a at the opposite end of supporting member 10a from dough reservoir 10. Cutter 22 comprises two thin, corrugated, spaced cutting knives 23 and 24 which are mounted on a plate 25. Plate 25 is rigidly affixed to one end of a shaft 26 which is rapidly reciprocated by means of a solenoid 27. A clearing bar 40 mounted on frame 10a prevents dough from lodging between knives 23 and 24. Solenoid 27 is provided with a restraining spring 46 and is operated by an automatic switch 28 which is in turn activated and controlled by timer 29.

Describing in more detail forming die 14, rollers 15 and 16 rotate within bearings provided in supports 30 and 31. The top roller 15 is driven by a motor (not shown) through a belt 32 and pulley 33 in a clockwise direction when viewed from the side upon which pulley 33 is mounted. Bottom roller 16 is rotated in the opposite direction (i.e., counter-clockwise) by means of intermeshing gears 34 and 35. As noted above, spalling of the surface of dough sheet 17 is prevented by rotating rollers 15 and 16 so that their peripheral velocity exceeds the linear velocity of the extruding sheet of dough.

A pair of vertically-oriented wires 36 are provided in front of the rollers 15 and 16 to trim the sides of dough sheet 17 as it emerges from the forming die 14. Deflectors 38 and 39 carry the strips of excess dough away from rotating drum 18.

In operation, dough is placed in reservoir 10 either by hand in batches or continuously by any convenient feeding means and feeding screw 11 is rotated at a constant speed to force the dough into and through forming die 14. Since feeding screw 11 is turned at a constant rate, the linear velocity of the dough passing through rollers 15 and 16 is constant. The driving means of rollers 15 and 16 is regulated to provide a peripheral roller velocity which is in excess of the linear velocity of the extruding dough.

Upon emerging from forming die 14 through rollers 15 and 16, dough sheet 17, which has been provided with longitudinal corrugations by rollers 15 and 16, falls upon and is supported by rotatable drum 18 and carried to cutter 22. Cutter 22 in response to a timing signal derived from timer 29, reciprocates at a constant rate and cuts dough sheet 17 transversely into elongated strips of dough which fall through an opening 47 provided in frame 10a. The corrugations on cutting knives 23 and 24 provide corrugated sides on the cut strips of dough. Cutter 22 is slideably positioned on supporting frame 10a so that the travel of cutting knives 23 and 24 may be adjusted. The cutter is adjusted so that the cutting blades strike rotating drum 18 sharply to insure complete cutting of dough sheet 17. Since drum 18 is formed from a moderately resilient deformable material, cutting knives 23 and 24 remain in a sharpened condition through many hours of operation.

As was previously noted, the linear velocity of extruding dough sheet 17 and the rate of reciprocation of cutting knives 23 and 24 remain constant. As long as this condition prevails, the strips of dough which are cut transversely from dough sheet 17 are of equal size. In situations where the rate of extrusion is not constant, as will exist when the rate of production is variable, it is necessary that the rate of reciprocation of cutter 22 be controlled to produce cut dough strips of equal size.

Referring now to FIG. 4, which is a perspective view of drum 18 incorporating another suitable means of control, a multiplicity of metallic protrusions 42 are arranged in an equally-spaced circular array on end 43 of drum 18. A microswitch 44 is mounted on frame 10a adjacent to the locus of protrusions 42. Microswitch 44, which is in the circuit of the power supply to solenoid 27, is actuated by sensing arm 45 which rides upon protrusions 42. Thus, whenever sensing arm 45 is deflected by a protrusion 42, power is supplied to solenoid 27 and cutter 22 is actuated. In this manner the rate of reciprocation of cutter 22 is controlled by the rate of rotation of drum 18, which is in turn determined by the rate of extrusion of dough sheet 17. Therefore, the size of dough strips which are cut transversely from dough sheet 17 remains uniform, even if the rate of dough extrusion is variable.

It should be apparent that many modifications of the improvement described above may be made within the scope of the present invention. For example, feeding screw 11 may be replaced by a mechanically or hydraulically driven piston. Similarly, the rate of reciprocation of cutter 22 may be controlled by any suitable means for sensing the linear velocity of dough sheet 17. Moreover, if one surface of the material being extruded need be smooth, only one rotating roller is needed. It is obvious, of course, that if only one roller is used some means of support must be used in place of the missing roller. A simple plate will suffice for this purpose. Since these and other changes may be made without departing from the scope of the present invention, it is intended that the invention be limited only as indicated in the following claims.

What is claimed is:

1. In a device adapted for forming a corrugated food product from a dough mass, the combination of:
   (a) an extrusion die provided with a rectangular opening at its forward end, said opening having a width substantially greater than its height;
   (b) a rotatable roller disposed adjacent and parallel to each of the upper and lower edges of said opening in position to contact a sheet of material being extruded; each said roll having circumferentially disposed corrugations thereon throughout substantially the full length thereof whereby corrugations are provided in the upper and lower surfaces of the dough mass throughout the entire width thereof;
   (c) means to rotate said rollers in the direction of extrusion at a peripheral velocity in excess of the linear velocity of the material being extruded;
   (d) a moving support including a rotatable member disposed adjacent to and below said opening with its axis substantially parallel to the axis of said rollers, and adapted to support extruded material emerging from between said rollers; and
   (e) means disposed adjacent to said moving support for cutting transversely a sheet of dough supported by said support.

2. In a device adapted for forming a dough, the combination of:
   (a) an extrusion die provided with a rectangular opening at its forward end;
   (b) a plurality of rotatable rollers disposed adjacent and parallel to an edge of said opening in position to contact material being extruded;
   (c) means to rotate said rollers in the direction of extrusion at a peripheral velocity in excess of the linear velocity of the material being extruded;
   (d) a freely rotatable cylindrical drum disposed adjacent to and below said opening with its axis substantially parallel to the axis of said rollers, and adapted to support and be revolved by said extruded material emerging from between said rollers, the speed of the drum being determined by the speed of the extruded dough;
   (e) at least one reciprocating cutting knife disposed adjacent and perpendicular to the surface of said drum; and
   (f) means to reciprocate said cutting knife at a rate proportional to the linear velocity of material being extruded.

3. In a device adapted for forming a dough, the combination of:
   (a) an extrusion die provided with a rectangular opening at its forward end;
   (b) at least two rotatable rollers disposed adjacent and parallel to an edge of said opening in position to contact material being extruded;
   (c) means to rotate said rollers in the direction of extrusion at a peripheral velocity in excess of the linear velocity of the material being extruded;
   (d) a rotatable cylinder drum disposed adjacent to and below said opening with its axis substantially parallel to the axis of said rollers, and adapted to support extruded material emerging from between said rollers, said drum having a plurality of protrusions arranged circumferentially in equally spaced relation around the axis thereof;
   (e) signal generating means disposed at a fixed location adjacent to said circumferential array of protrusions and adapted to emit a signal upon passage of each of said protrusions upon rotation of said drum;
   (f) at least one reciprocating cutting knife disposed adjacent and perpendicular to the surface of said drum; and (g) means responsive to the signal from said signal generating means to reciprocate said cutting knife.

4. The device of claim 2 wherein said reciprocating means (g) is a solenoid.

5. The device of claim 4 wherein said signal generating means (e) is a microswitch.

6. In the method of forming a dough product which comprises extruding dough to form a continuous sheet having a tendency to spall, passing said sheet between a pair of spaced, rotatable forming rolls, rotating said rolls in the direction of travel of said extruded dough sheet at a peripheral velocity in excess of the linear velocity of said extruded sheet, allowing the dough to fall onto a freely rotatable supporting surface adapted to be revolved in the same direction and velocity as said dough sheet and repeatedly cutting the dough sheet upon the supporting surface to sever the dough sheet.

7. In a device adapted for forming a viscous dough, the combination of:

(a) means for extruding a sheet of dough continuously at a predetermined linear velocity including an extrusion die provided with a rectangular opening at its forward end;

(b) at least two rotatable rollers disposed adjacent and parallel to an edge of said opening in position to contact dough being extruded;

(c) means to rotate said rollers in the direction of extrusion at a peripheral velocity in excess of the linear velocity of the dough being extruded;

(d) a freely rotatable cylinder drum disposed adjacent to and below said opening with its axis substantially parallel to the axis of said rollers, and adapted to support and be revolved by the extruded dough emerging from the means for extruding a sheet;

(e) a timing device including means for generating a signal at predetermined intervals;

(f) at least one reciprocating cutting knife disposed adjacent and perpendicular to the surface of said drum; and (g) means responsive to the signal from said timing device to reciprocate said cutting knife.

References Cited by the Examiner

UNITED STATES PATENTS

| | | | |
|---|---|---|---|
| 660,901 | 10/00 | Jenkins | 107—10 |
| 1,689,199 | 10/28 | Ganz et al. | 107—10 X |
| 1,720,097 | 7/29 | Scholz | 107—10 |
| 1,919,361 | 7/33 | Farrington | 18—12 |
| 2,001,792 | 5/35 | Lombi | 107—69 X |
| 2,173,000 | 9/39 | Holtzman et al. | 107—69 X |
| 2,599,894 | 6/52 | Campbell | 107—69 |
| 2,798,548 | 7/57 | Leirer | 83—369 X |
| 2,920,681 | 1/60 | Humphner | 83—208 X |
| 2,951,456 | 9/60 | Olgiati | 107—4.2 |

ROBERT E. PULFREY, *Primary Examiner.*

CHARLES A. WILLMUTH, *Examiner.*